Figure 1:
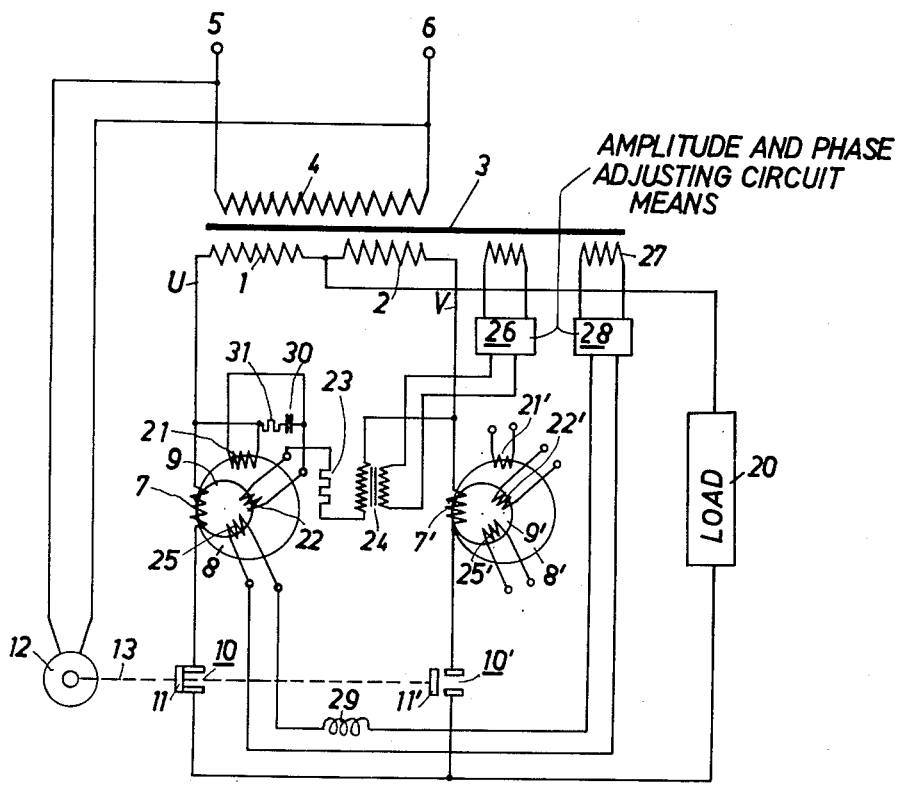

Sept. 18, 1951  M. BELAMIN  2,568,140
SYNCHRONOUS SWITCHING APPARATUS FOR ELECTRIC CIRCUITS
Filed Dec. 4, 1950

INVENTOR
Michael Belamin.
BY
ATTORNEY

Patented Sept. 18, 1951

2,568,140

UNITED STATES PATENT OFFICE 2,568,140

SYNCHRONOUS SWITCHING APPARATUS FOR ELECTRIC CIRCUITS

Michael Belamin, Nurnberg, Germany, assignor to Siemens - Schuckertwerke, Aktiengesellschaft, Berlin-Siemensstadt, Germany, a corporation of Germany Application December 4, 1950, Serial No. 199,003
In Germany October 1, 1948

5 Claims. (Cl. 175—294)

My invention relates generally to synchronous switching apparatus, and in a more particular aspect to periodically operating contact apparatus for the conversion of alternating current, in which the switch contacts are series connected with saturable commutating reactors whose temporary increase in reactance near the current zero passages produces a local flattening of the current curve and thus reduces the current-carrying duty of the contacts at the time of their opening and closing performance.

For most favorable commutating conditions at both the opening and the closing of the contacts, such apparatus have been equipped with two reactors in each phase, one—the "break reactor"—for optimum condition at the opening a break moment and the other—the "make reactor"—for optimum condition at the closing a make moment. It is also known to structurally combine the break reactor with the make reactor by giving them a single reactance winding series connected with the contact of the appertaining phase circuit and inductively linked with two magnetic circuits or reactor cores differently rated and/or differently premagnetized for the respective break reactor and make reactor operations.

In apparatus of the above mentioned kind, having separate or combined break and make reactors, a voltage peak or kick may occur at the moment of the circuit-breaking contact separation. This voltage tends to ionize the gaseous medium between the separating contact members and hence in turn may cause damage by burning or transfer of contact material. The voltage kick is due to the sudden interruption of the residual current which at the interrupting moment is still flowing in the cross circuit between the commutating phases and which is affected not only by the air inductance of the cross-phase circuit but also by the jump in the magnetic induction of the make reactor. The induction jump in the make reactor at the moment of circuit interruption occurs in the known apparatus regardless of whether or not the make reactor is separately pre-magnetized by bias voltage.

If the make reactor is not separately biased by premagnetization of the corresponding reactor core, then the make reactor is nevertheless premagnetized during the break step of the current curve caused by the break reactor, this premagnetization being due to the uncompensated residual or error current flowing through the contact immediately prior to the interruption moment. As a result, the magnetic field strength of the make reactor changes suddenly and jumps from a positive or negative value to zero, depending upon the direction of the residual current. Hence, the induction of the make reactor passes through a difference of smaller or larger magnitude, depending upon the slant of its hysteresis loop at that point, and a corresponding peaked voltage is generated in the contact circuit as mentioned previously.

If the make reactor is separately premagnetized by bias voltage in order to minimize the make step current, then the above-explained voltage producing phenomena are essentially the same, except that, due to the bias premagnetization, they are shifted into the positive range of the hysteresis loop. Since the hysteresis loop is more slanted at the corresponding point, the induced voltage kick is correspondingly larger.

It is therefore an object of my invention to virtually or fully eliminate the above-mentioned detrimental voltage kick caused at the circuit opening moment by inductive effects of the make reactor in apparatus of the above mentioned kind.

An ancillary object of my invention is to provide in such synchronous contact apparatus the make reactor with a separate bias excitation which varies periodically in such a manner that it changes from the value most desirable during the make time intervals, to a different value which occurs during the break intervals and has then a polarity suited to obviate or suppress the above-mentioned disturbance voltage.

To this end, and in accordance with my invention, I minimize induced voltage peaks at the contact opening moment by then applying to the make reactor a premagnetization of such a polarity and magnitude that the magnetic field strength in the make reactor core is remote from the lower knee of the hysteresis loop and that the initial moment of the break performance occurs within a flat range of the hysteresis curve of the make reactor. At the contact closing moment, however, I apply to the make reactor core a premagnetization of the opposite polarity and of a sufficient magnitude to keep the residual current during the make step interval as small as possible, the latter premagnetization being usually so high that an appreciable portion of the make step interval expires before the closing moment of the appertaining synchronous contacts.

According to a more specific feature of my invention, the just-mentioned periodically variable premagnetization of the make reactor is produced as the resultant of two component excitation voltages or magnetic fields. Accordingly, two electric excitation circuits are provided for the make reactor and these circuits are connected with coil means on the make reactor core to magnetize the core separately from the reactor main winding by two voltages impressed upon the two excitation circuits, respectively. One of the two circuits is connected across the commutating phases of the contactor circuit and hence energized by a cross current which produces in the make reactor a component premagnetization whose time wave is essentially sinusoidal but has inwardly dented half-wave tops. The other excitation circuit is connected with a supply of sinusoidal voltage synchronized with the contact load voltage and superimposes on the above-mentioned excitation component a second component with a sinusoidal half wave of smaller amplitude and opposite polarity so as to complement the first mentioned component to a resultant bias field which for the break interval shifts the field strength of the make reactor along the magnetic loop characteristic from one polarity into the saturated range of the opposite (for instance, negative) polarity, while placing the field strength during the make interval into the first-mentioned (for instance, positive) polarity range of the loop characteristic.

Figure 2:
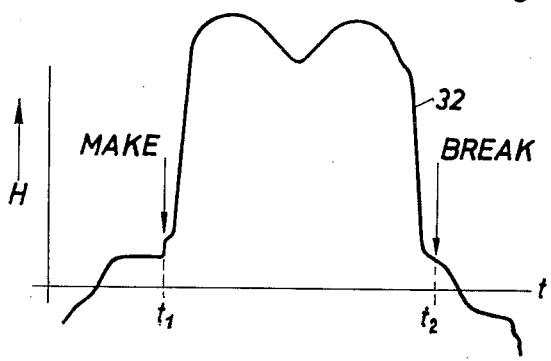

The foregoing and more specific features of the invention will be apparent from the embodiment exemplified by the drawing and described in the following. In the drawing, Figure 1 shows the schematic circuit diagram of a two-phase rectifying apparatus according to the invention, and Figure 2 is an explanatory co-ordinate diagram representing the field excitation versus time of a make reactor core appertaining to the apparatus of Figure 1.

The illustrated rectifying apparatus is energized from the secondaries 1 and 2 of a power transformer 3 whose primary 4 is connected to terminals 5 and 6 for attachment to an alternating-current line. The secondaries 1 and 2 form part of respective phase circuits U and V. Connected in phase circuit U is the main reactance winding 7 of a saturable reactance device with two magnetizable cores 8 and 9. Series connected with the main reactor winding 7 is a contact device 10 whose movable contact 11 is actuated by a synchronous motor 12 through a mechanical transmission schematically indicated by a broken line 13. Motor 12 is energized from the terminals 5 and 6 to operate in synchronism with the current to be rectified. The phase adjustment of contact 11 is such that it opens and closes the circuit periodically in synchronism with the alternating current near respective zero passages of the phase current induced in the transformer secondary 5. The saturable reactance device becomes unsaturated when the instantaneous current reaches small values near the current zero passage. As a result, the reactance of winding 7 is then suddenly increased and flattens the current curve, thus providing a step or interval of time within which the contact 11 can open or close under low-current and low-voltage conditions. The saturable core 8 (break reactor) is effective to provide most favorable reactance conditions and hence a current step of minimum magnitude and proper phase position during the contact opening or break performance of the contact device 10. The core 9 (make reactor) is provided to secure similarly favorable conditions during the closing or make performance of the same contact device.

The circuit of phase V includes the main winding 7' of a saturable reactance device in series with a synchronous contact device 10' whose movable contact 11' is also actuated by the motor 12. Contacts 11 and 11' are phase displaced relative to each other to provide for proper commutation and rectification. As shown, the direct current load 20 is connected between the mid point of the transformer secondaries 5, 6 and a common circuit point of the commutating contact devices 10 and 10'.

The break core 8 has a bias winding 21. The make core 9 has two bias windings 22 and 25 excited separately from each other to impose on the make core 9 respective components of excitation. The windings 21 and 22 are series connected with each other in a cross circuit which extends between the phase leads U and V and includes a series resistor 23 and the secondary of an auxiliary transformer 24. Consequently, windings 21 and 22 are excited by alternating cross current. In addition, a modifying alternating voltage synchronous with the voltage of the current to be converted is impressed on the cross-phase circuit by means of transformer 24. To this end, the primary of transformer 24 is connected with the current supply, for instance, by means of an auxiliary secondary winding 25 on the power transformer 3. The connection may include phase positioning and amplitude adjusting means schematically indicated at 26. The excitation impressed on the winding 22 of the make reactor core 9 has generally sinusoidal shape with inwardly dented wave tops. The depression of the wave tops is due to the fact that at this time the break core 8 is reversely magnetized and produces the low-current step for the switching-out operation. By transformer action the break core then induces in winding 21 a voltage which causes the just-mentioned depression in the current wave tops. The second bias winding 25 of make core 9 is supplied with alternating voltage synchronous with the voltage of the current to be converted. In the illustrated embodiment, the excitation voltage for winding 25 is also taken from the alternating-current supply with the aid of an auxiliary secondary 27 of the power transformer 3. Amplitude and phase adjusting circuit means as schematically represented at 28 may be interposed. The phase position of the sinusoidal voltage impressed on bias winding 25 is such that the corresponding component pre-excitation in core 9 is opposed to the component excitation produced by the winding 22, and the amplitude of excitation from winding 25 is smaller than that of the excitation from winding 22. A reactor 29 is connected in the circuit of coil 25 to stabilize a practically sinusoidal current in this circuit. An auxiliary series connection of a capacitor 30 and a resistor 31 is attached across winding 21.

As shown, the cores 8' and 9' appertaining to the reactance winding 7' for phase V are also equipped with windings 21', 22' and 25'. These windings are connected and energized in the same manner as described above with reference to phase U, the appertaining circuits being not illustrated because they are cyclically similar to those already described.

The resultant excitation of the make core 9 or 9' is typified by the curve 32 in the coordinate diagram of Figure 2. The ordinate represents the resultant magnetizing current and hence the corresponding resultant premagnetizing field strength H of the reactor core, and the abscissa represents time. The contact device 10 or 10' of the appertaining phase closes at the moment $t_1$ and opens at the moment $t_2$. The closing moment $t_1$ occurs within the range of a low and relatively constant premagnetization during which the make reactor core 9 is unsaturated and has high reactance, thus providing a weak-current step of a duration substantially similar to that of the step recognizable from Figure 2. It is apparent from Figure 2 that the contact closing moment $t_1$ in apparatus according to Figure 1 occurs after a considerable portion of the make step interval has expired. It will be understood that at the opening moment $t_2$ the break reactor core 8 is effective to provide for a weak-current interval (not apparent from Figure 2). At the opening moment $t_2$ the polarity of the premagnetization in the make core 9 is opposite to that obtaining if the above-explained particular premagnetization characteristic according to the invention is not effective. It is further apparent from Figure 2 that at the break moment $t_2$ the change in magnetization of the make core is gradual, i. e. this change is not by far as abrupt as in the above-mentioned known apparatus. This accounts for the elimination of the detrimental voltage kick which in prior apparatus occurred between the separating contacts at the opening moment due to the inductance change of the make reactor core.

While in the illustrated embodiment the primary of transformer 24 and the reactor bias winding 25 are connected to different transformer secondaries, it will be understood that the circuit can be modified in various respects, for instance, by providing a single transformer secondary for supplying sinusoidal voltage to the circuits of both windings 22 or 25, or by supplying the sinusoidal voltage for one or both of these windings with the aid of a transformer separate from the main power transformer. The invention, of course, is similarly applicable to three-phase or other polyphase circuits as well as for current control or converting purposes other than rectification. In polyphase apparatus, the above-described reactor pre-excitation circuits are similar and cyclical, that is, each of the phases is equipped with devices as described and explained in the foregoing.

I claim:

1. Synchronous switching apparatus for alternating current, comprising synchronous contact means and reactor means series connected with each other, said reactor means having a saturable break core and a saturable make core for flattening the current characteristic during break and make operations respectively of said contact means, two excitation circuits inductively linked with said make reactor core, one of said circuits being connected across said contact means to provide a first component excitation of a generally sinusoidal wave shape with an inwardly deformed wave top in each half wave, synchronous voltage supply means of sinusoidal voltage, said other circuit being connected with said supply means to provide a second component excitation of opposed polarity and smaller amplitude than said first component excitation, said component excitations having a resultant which at the closing moment of said contact means has a value of said given polarity and at the opening moment of said contact means as a saturation value of said other polarity.

2. Synchronous switching apparatus for alternating current, comprising synchronous contact means and reactor means series connected with each other, said reactor means having a saturable break core and a saturable make core for flattening the current characteristic during break and make operation respectively of said contact means, said make core having two premagnetizing windings, an impedance circuit extending across said contact means and including one of said windings for impressing on said make core a first component excitation of a generally sinusoidal wave shape with an inwardly deformed wave top in each half wave, and synchronous voltage supply means of sinusoidal voltage connected with said other circuit to impress on said make core a second component excitation opposed to said first component excitation and having a smaller amplitude than said first component excitation whereby the resultant premagnetization of said make reactor core at the closing moment of said contact means has a strength of one polarity and at the opening moment of said contact means has a strength of the opposite polarity and in the saturated range of the magnetic characteristic.

3. Synchronous switching apparatus for alternating current, comprising a multiphase circuit, a plurality of commutating contact means disposed in the respective phases of said circuit, reactor means series connected with said contact means in each of said phases and having a saturable break core and a saturable make core for flattening the current characteristic during break and make operations respectively of said contact means, two excitation circuits inductively linked with each of said make cores for imposing thereon a resultant excitation to impart to said make core at the contact opening moment a magnetization of a polarity opposite to that obtaining at the contact closing moment, one of said excitation circuits being connected across said phases of said multiphase circuit to provide a first component excitation, and synchronous voltage supply means connected to said other excitation circuit to provide a second component excitation, said voltage supply means having a voltage of a magnitude and polarity needed to give said second component excitation of opposed polarity and smaller amplitude compared with said first component excitation.

4. Synchronous switching apparatus for alternating current, comprising a multiphase circuit, a plurality of commutating contact means disposed in the respective phases of said circuit, reactor means series connected with said contact means in each of said phases and having a saturable break core and a saturable make core for flattening the current characteristic during break and make operations respectively of said contact means, said make core having two premagnetizing windings, an impedance circuit comprising a transformer and connecting one of said windings across said phases of said multiphase circuit, synchronous voltage supply means of sinusoidal voltage connected with said transformer to impose jointly with said impedance circuit a larger component field excitation of inwardly dented half-wave shape on said make reactor core, and circuit means connecting said voltage supply means with said other winding to impose on said make core a smaller component field excitation opposed to said first component field excitation, whereby peak voltages at the opening moment of said contact means are minimized.

5. Apparatus according to claim 4, comprising a premagnetizing winding on said break reactor core, said latter winding being series connected in said cross-phase impedance circuit.

MICHAEL BELAMIN.

REFERENCES CITED

The following references are of record in the file of this patent:

UNITED STATES PATENTS

| Number | Name | Date |
|---|---|---|
| 2,351,975 | Koppelmann | June 20, 1944 |
| 2,466,864 | Prati | Apr. 12, 1949 |